(12) United States Patent
Kay

(10) Patent No.: US 8,608,476 B1
(45) Date of Patent: Dec. 17, 2013

(54) FABRIC MOSAIC ART KIT

(76) Inventor: Steven Kay, Halifax (CA)

(*) Notice: Subject to any disclaimer, the term of this patent is extended or adjusted under 35 U.S.C. 154(b) by 102 days.

(21) Appl. No.: 13/453,462

(22) Filed: Apr. 23, 2012

(51) Int. Cl.
G09B 19/00 (2006.01)
(52) U.S. Cl.
USPC .......................................... 434/96
(58) Field of Classification Search
USPC ............ 434/81, 83, 84, 95, 96, 97; 112/404, 112/405; 156/63; 428/99, 102
See application file for complete search history.

(56) References Cited

U.S. PATENT DOCUMENTS

| 3,404,647 | A | * | 10/1968 | Pohl et al. ............. 112/405 |
| 3,570,435 | A | * | 3/1971 | Morrison ............. 112/475.18 |
| 4,355,722 | A | * | 10/1982 | Lemmeyer ............. 206/575 |
| 4,445,950 | A | * | 5/1984 | Browning ............. 156/63 |
| 4,814,218 | A | * | 3/1989 | Shane ............. 428/102 |
| 4,912,850 | A | * | 4/1990 | Gray ............. 33/1 G |
| 4,993,984 | A | * | 2/1991 | Matarese ............. 446/118 |
| 5,292,255 | A | * | 3/1994 | Goldwasser ............. 434/84 |
| 5,439,538 | A | * | 8/1995 | Perry ............. 156/63 |
| 8,367,185 | B1 | * | 2/2013 | Kay ............. 428/138 |

OTHER PUBLICATIONS

Show Me How to Hook, www.rughooking101.com/articles/12-show-me-how-to-hook, accessed on Apr. 4, 2011.
How to Make a Prodded Rug, www.ehow.com/how_4420872_make-prodded-rug.html, accessed on Apr. 4, 2011.
How do I Prod and Hook a Rug?, www.ehow.com/how_6889583_do-prod-hook-rug_.html, accessed on Apr. 4, 2011.
How to Make a Hooked Rug, www.ehow.com/how_4903990_hooked-rug.html, accessed on Apr. 4, 2011.

* cited by examiner

Primary Examiner — Kurt Fernstrom
(74) Attorney, Agent, or Firm — Bert P. Krages, II

(57) ABSTRACT

A kit by which a fabric mosaic may be assembled comprising a template, fabric pieces, and stylus. The fabric pieces are secured to the template by inserting portions of the fabric pieces into opening where they are secured by an interference fit.

14 Claims, 6 Drawing Sheets

FABRIC MOSAIC ART KIT

SUMMARY OF THE INVENTION

The present invention is directed to the field of educational toys and comprises a kit having a template, fabric pieces, a stylus tool, and preferably a work surface in the form of a pad. When assembled, the kit enables a user to create a mosaic artwork in which the pattern is formed by a plurality of fabric pieces having different colors. The template preferably has a preprinted pattern that provides guidance to the user on how to position the fabric pieces. In the preferred embodiment. the printed template has a number or color code system that is accompanied by a legend that associates a piece of fabric having a specific color to a particular location on the template.

The mosaic is built by inserting a plurality of precut fabric pieces in a variety of colors into openings in the template where the fabric pieces are secured by an interference fit (also known as a press fit or friction fit). In the preferred embodiment, the fabric is cut into squares that are about 12 to 25 millimeters square or circles that are about 12 to 50 millimeters in diameter. However, the fabric pieces may vary in size, color, texture, material, and shape depending on the project. The fabric pieces may be constructed of a variety materials including, but not limited to satin, tricot, foils, polyurethane fabrics, lycra, nylon, cotton, fleece, polyester, vinyl, plastic, and knits.

The template consists of a planar sheet that has been perforated with openings such as slits, slots, or holes into which a piece of fabric may be inserted and secured. Preferably, the template is made from flexible plastic foam, such as polyurethane or ethylene-vinyl acetate, having a thickness between 0.5 to 6.5 millimeters. However, any material that can be formed into a sheet and have the requisite openings may be used. Examples of other materials include mesh fabrics, screens, and leather. The template may be coded with a pattern that indicates where fabric pieces having a particular color should be secured. For example, the pattern could consist of individual circles, ovals, or polygons that enclose numbers that are referenced on a legend that indicates which fabric pieces should be fit into particular locations on the templates. For example, a legend based on numbers on the template could have the following coding: 1—Green, 2—Magenta, 3—Yellow, 4—Purple, and 5—Blue. This legend is merely exemplary. Alternatively, the template could be preprinted with areas having different colors to indicate that fabric pieces having those colors should be secured within those areas. Other number schemes, hues, materials and textures can be employed to indicate where the fabric pieces should be positioned on the template. The template may also have an overlay made of paper, vinyl, polyurethane fabric, or similar thin sheet material onto which a pattern or other decorative or instructional matter may be printed. The overlay may be secured to the template with adhesive.

A stylus tool may be used to push the pre-cut fabric pieces into the openings in the template. Preferably, the stylus is molded of hard plastic and has a small round tip on the end to reduce the chance that the fabric might be damaged during pushing and to enhance safety to the user. The technique used to install the fabric pieces into the template consists of placing a fabric piece over the appropriate location on the template, placing the tip of the stylus inside the perimeter of the fabric, and pushing down over the selected opening in the template so that part of the fabric piece is forced either partially into or completely through the opening in the template. Fabric pieces are thus installed onto the template in a desired pattern to form a mosaic work of art.

The template may also be laid on a work pad for support and to facilitate pushing the fabric pieces through the openings of the template. An example of a suitable work pad is ethylene vinyl acetate (EVA) foam having a thickness of about 6 millimeters. Preferably, the work pad will be sufficiently resilient to compress in response to force from the stylus yet promptly return to its original shape after the stylus is lifted.

In addition to the fabric pieces, the kit can also include decorative pieces that resemble ornamental features such as eyes or lips. These pieces can be attached to the mosaic by means such as a adhesives, clips, pins, or hook-and-loop fasteners. They can also be constructed to have a post or cord attached to the underside of the decorative piece that can be inserted into and thus secured by one of the openings of the template. The decorative pieces may be made of any flexible, semi-rigid, or rigid material suitable for the purpose including felt, soft plastic, hard plastic, rubber, cords, ribbons, or metal.

DETAILED DESCRIPTION OF THE PREFERRED EMBODIMENT

Figure 1:
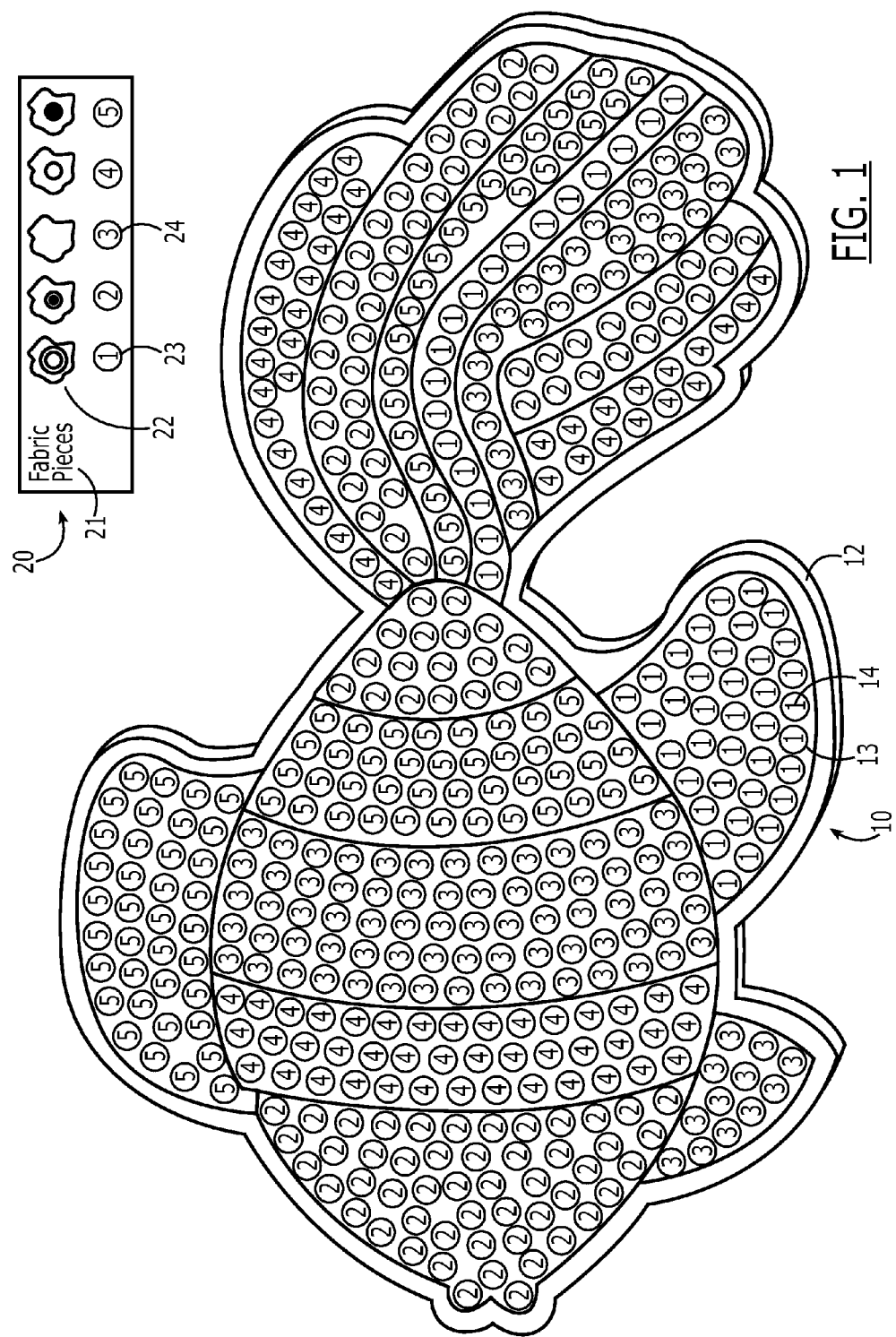
FIG. 1 is a top view showing the template with a preprinted pattern and a legend.
Figure 2:
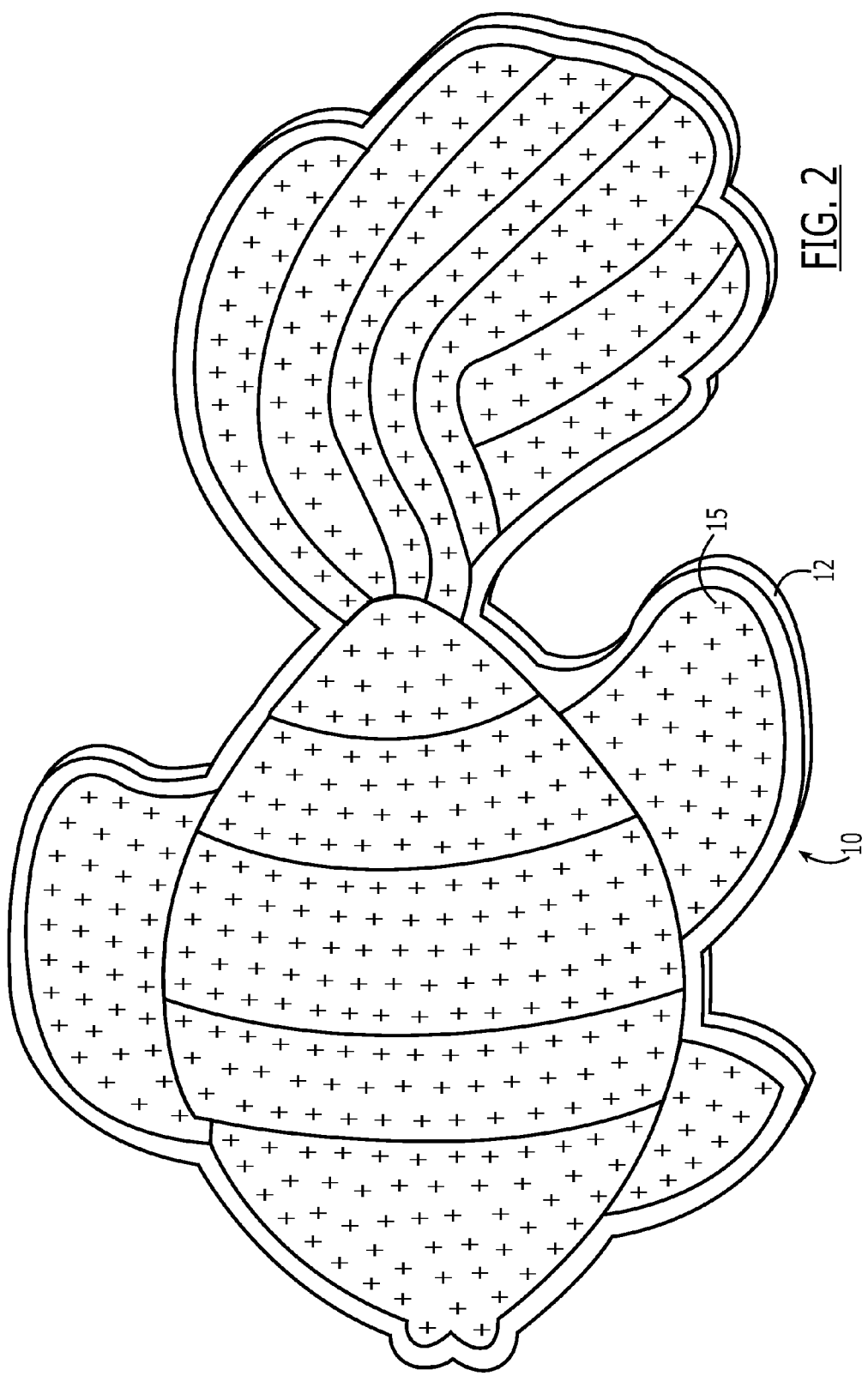
FIG. 2. is a top view of the template showing the location of the die cut openings.

FIG. 1 shows the template 10 consisting of a sheet 12, pattern markers 13, and color indicia 14. Also depicted is a legend 20 consisting of a label 21, fabric piece indicia 22, pattern marker indicia 23, and legend color indicia 24. FIG. 2 shows the template 10 with the openings 15. In the preferred embodiment, the template 10 is manufactured by using a punch press to simultaneously cut the sheet and create the openings 15. The sheet 12 is preferably made of flexible closed cell plastic foam having a thickness of 2 millimeters. The openings 15 are preferably slits made in the shape of an equilateral cross or a "Y" but any shape will suffice. The pattern markers 13 shown in FIG. 1 are preferably in the shape of circle and are centered on the openings 15 shown in FIG. 2. The color indicia 14 indicate that a fabric piece having a particular color is to be inserted into the opening 15 that is lies beneath the color indicia 14 and surrounded by a pattern marker 13.

The legend 20 shown in FIG. 1 has a label 21 adjacent to fabric piece indicia 22. The fabric piece indicia 21 indicate a piece of fabric having a particular color. Beneath each fabric piece indicia 22 are pattern marker indicia 23 which surround legend color indicia 24. By comparing the color indicia 14 on the template 10 with the legend color indicia 24 on the legend 20, the user can determine by consulting the associated fabric piece indicia 22, the particular color of fabric to be inserted into the opening 15 (shown in FIG. 2) at the color indicia 14.

Figure 3:
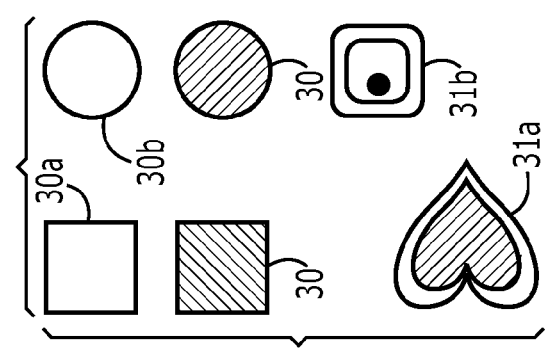
FIG. 3 is a top view depicting the fabric pieces, and decorative pieces.

FIG. 3 is a top view showing fabric pieces 30a and 30b and decorative pieces 31a and 31b. Fabric piece 30a is in the shape of a square and fabric piece 30b is in the shape of a circle. The fabric pieces 30 have a variety of colors, meaning that the fabric pieces included in the kit are made from fabrics of at least two different colors. For example, one set of fabric pieces 30 might be made from green fabric, another set made from blue fabric, and so on. In the preferred embodiment, the fabric pieces are monochromatic but multi-colored fabric pieces can be used with the kit, The fabric pieces 30 may also be made from fabrics having different textures. For example, some fabric pieces 30 might be made from velvet, other from taffeta, and so on. Also shown are decorative pieces 31a and 31b. Decorative piece 31a is depicted in the shape of stylized fish lips and has a printed surface to better depict the stylized features. Decorative piece 31b is in the shape of a stylized fish eye and has a printed surface to better depict the stylized features.

Figure 4:
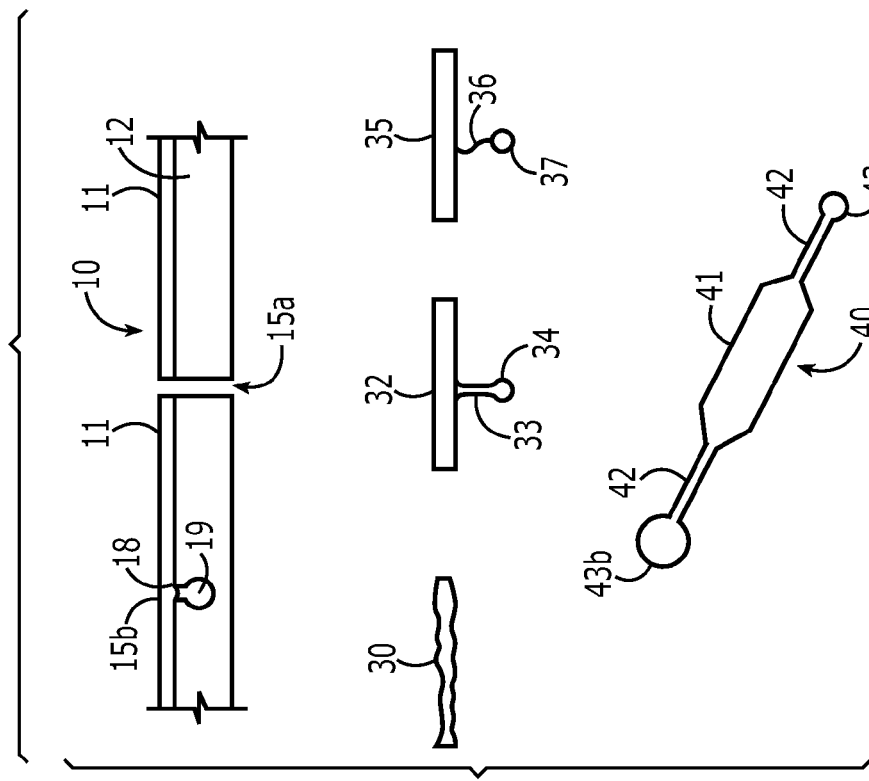
FIG. 4 is a side view depicting the stylus, template, fabric piece, and decorative pieces.

FIG. 4 is side view showing fabric piece 30, decorative piece 32 configured with a post 33 with a ball-shaped terminus 34, decorative piece 35 configured with a cord 36 and bead terminus 37, and a double-ended stylus 40 consisting of a handle 41, shafts 42, a small tip 43a and a large tip 43b. The tips 43a and 43b are generally spherically shaped and have a diameter greater than that of the shaft 42. The tips 43a and 43b have different diameters to accommodate different thicknesses of fabric. FIG. 4 also depicts the template 10 in cross section showing the sheet 12 and a paper overlay 11. The template can be constructed with perforation-type openings 15a which passes completely through the sheet 12 or with enclosed openings 15b that terminate within the sheet. Preferably the enclosed openings 15b consist of an inlet 18 terminating with a spherical space 19 having a larger diameter than the inlet 18.

Figure 5:
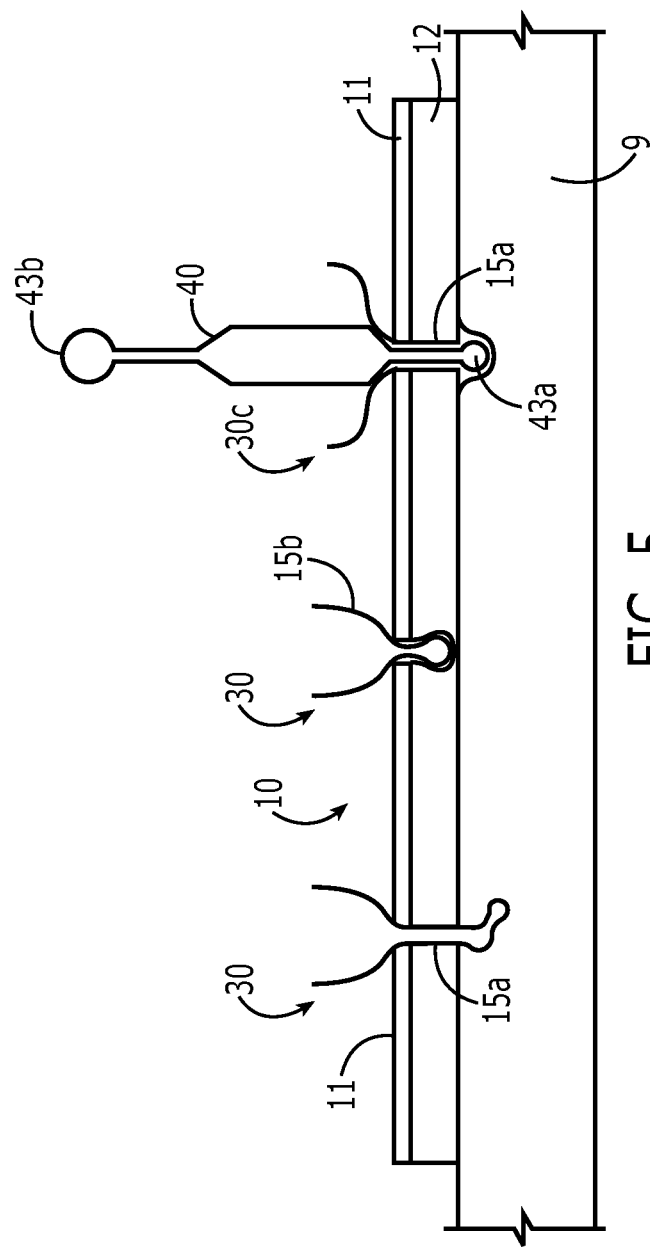
FIG. 5 is a cross-sectional view showing the attachment of fabric pieces to the template.

FIG. 5 is a cross sectional view depicting installed fabric pieces 30 and the insertion of a fabric piece 30c. To facilitate insertion, template 10 can rest on a work pad 9. As stated previously, work pad 9 preferably should be made of a resilient material such as EVA and have a thickness of at least 6 millimeters. To illustrate how to insert a fabric piece into a perforation-type opening 15a, the fabric piece 30c is first placed over the opening 15a. The tip 43a of the stylus 40 is placed on the fabric piece 30c and pushed into the opening 15a until the center portion of the fabric piece is pushed out the opposite side of the sheet 12. The portion of the work pad 9 underlying the opening 15a compresses to allow the tip and center portion of the fabric piece 30c to pass through the sheet 12. When the stylus is retracted, the center portion of the fabric piece 30c is retained by an interference fit with the opening 15a. To insert a piece of fabric into an enclosed opening 15b, the fabric piece 30 is first placed over the opening 15b. The tip 43a or 43b of the stylus 40 is placed on the fabric piece 30 and pushed into the opening 15b until the center portion of the fabric piece is pushed to the bottom of the spherical space 19 of the opening 15b, at which point the user will feel a change in the resistance being applied to the stylus 40. The tip 43a or 43b is then retracted from the opening 15b leaving the center portion of the fabric piece 30 enclosed within the spherical space 19 and the inlet 18 of the opening 15b, thus securing the fabric piece 30 to the sheet 12.

Figure 6:
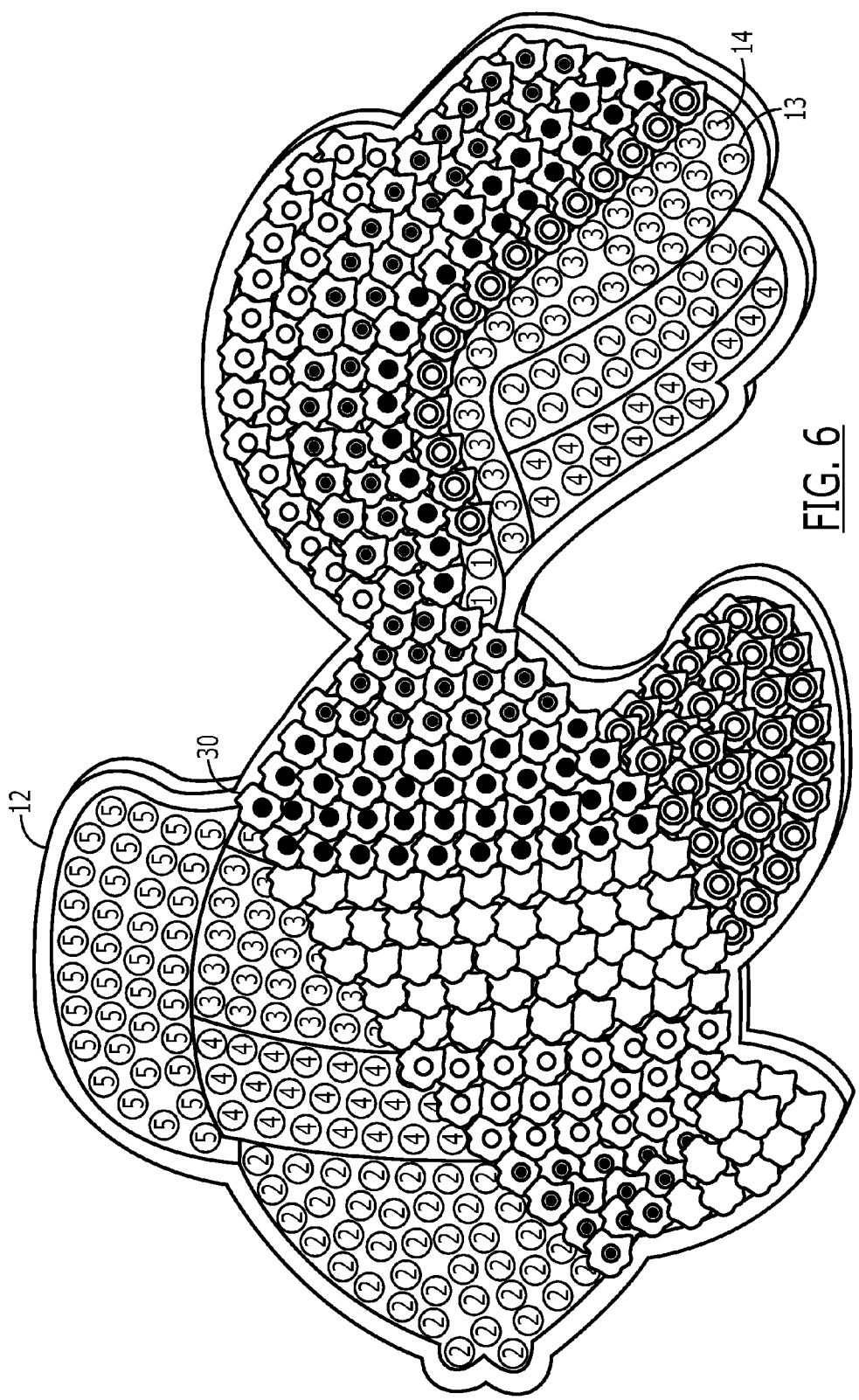
FIG. 6 is a top view of a partially completed artwork.
Figure 7:
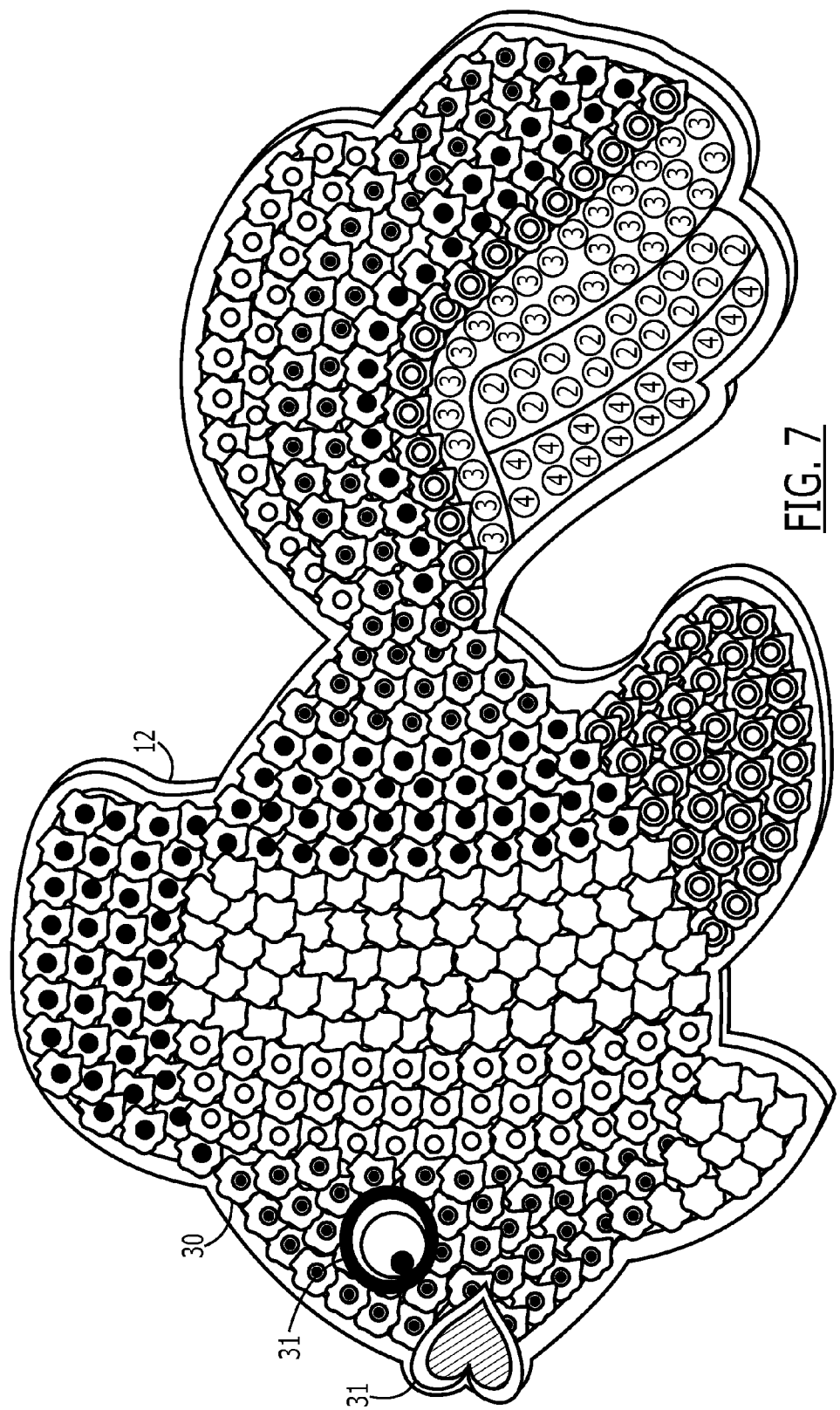
FIG. 7 is a top view showing the partially completed artwork with decorative pieces installed.

As shown if FIGS. 6 and 7, multiple fabric pieces 30 are secured to the sheet 12 in accordance with the pattern markers 13, and color indicia 14. In the preferred embodiment, where fabric pieces 30 having a width or diameter of about 25 millimeters are used, the pattern markers are ideally spaced about 5 millimeters apart. When the fabric pieces 30 have been secured to the sheet 12, they create a mosaic effect. After the fabric pieces 30 have been secured, decorative pieces 31 may be secured to fabric pieces 30 by adhesives or secured to the sheet 12 by inserting the ball-shaped terminus 34 attached to a post 33 or the bead terminus 37 attached to a cord 36 (shown in FIG. 4) into an opening 15a or 15b (also shown in FIG. 4).

While the present invention has been described with regard to the preferred embodiments, it should be understood that the invention is not limited to these embodiments and a number of variations and modifications can be made to the structure described above without departing from the spirit and scope of the present invention.

The invention claimed is:

1. A fabric mosaic kit comprising
a) a plurality of fabric pieces having a variety of colors;
b) a template having a thickness and further having a plurality of openings for securing the center portions of said fabric pieces:
whereby the center portions of said fabric pieces can be secured into said openings in a desired pattern to form a mosaic art work.

2. The kit of claim 1 wherein said template includes a pre-printed pattern which is coded to receive a particular one of said variety of colors at a particular opening.

3. The kit of claim 1 further comprising a color grid system formed on said template indicating appropriate placement of selected fabric pieces thereto to produce the desired pattern.

4. The kit of claim 1 further comprising a stylus.

5. The kit of claim 1 further comprising a work pad to be placed beneath said template.

6. The kit of claim 1 in which said fabric pieces are square.

7. The kit of claim 1 in which said fabric pieces are circular.

8. The kit of claim 1 wherein the ratio of the width of the fabric pieces to the distance between the pattern markers is 5:1.

9. The kit of claim 1 wherein said openings extend completely through the thickness of said template.

10. The kit of claim 1 wherein said openings extend partially through the thickness of said template.

11. The kit of claim 1 wherein said thickness is 2 millimeters or greater.

12. The kit of claim 1 wherein said thickness ranges between 2 and 6.5 millimeters.

13. The kit of claim 1 further comprising an overlay secured to said template.

14. The kit of claim 1 further comprising decorative pieces to be secured to the mosaic artwork.

* * * * *